Figure 1:
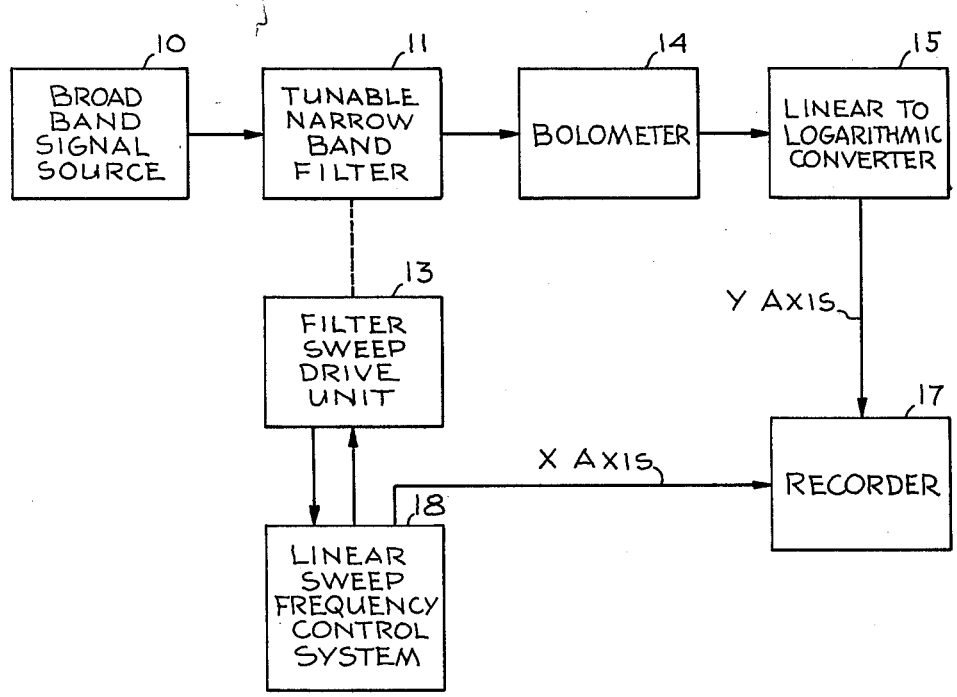

DENNY D. PIDHAYNY
LAWRENCE E. JONES
EVERETT M. GOODELL
INVENTORS

United States Patent Office 3,153,192
Patented Oct. 13, 1964

3,153,192
FREQUENCY SPECTRUM POWER MEASURING SYSTEM INCLUDING NON-LINEAR COMPENSATING MEANS
Denny D. Pidhayny, Los Angeles, Lawrence E. Jones, Canoga Park, and Everett M. Goodell, Palos Verdes Estates, Calif., assignors, by mesne assignments, to Space Technology Laboratories, Inc., El Segundo, Calif., a corporation of Delaware
Filed Aug. 12, 1960, Ser. No. 49,207
16 Claims. (Cl. 324—77)

This invention relates to systems for measuring the frequency characteristics of an electrical signal source, and more particularly to a new and improved system for providing a linear change of a frequency characteristic of a control element in an arrangement in which the control element scans a band of frequency to measure the frequency characteristics of an electrical signal source.

In measuring the characteristics of a broad band electrical signal source, it is frequently desirable to measure the power emanating from the signal source at discrete frequencies falling within the band. In the past, a tunable filter has been employed which is manually set to discrete frequency, with a power measuring device being connected to the output of the filter to measure the power characteristic of an unknown electrical signal at the frequency to which the filter is tuned. Where extremely broad band signals are involved, as in microwave systems in which broad band noise signal sources are frequently employed, the process of measuring the power spectrum is not only tedious but is inaccurate as well inasmuch as over the period of time required to make the necessary number of discrete frequency measurements, the noise source or the measuring equipment may drift or change in sufficient amount to render the overall results unacceptable. Furthermore, the tunable filter is generally adjusted by means of a micrometer type dial, with the frequency to which the filter is tuned being related in a nonlinear fashion to the position of the dial. Since literally thousands of separate frequency readings may have to be taken in a given case, it is physically impossible to manually position the micrometer dial within a period of time in which the electrical signal source and measuring equipment remain stable in operation.

Accordingly, it is a principal object of the present invention to provide a new and improved power spectrum measuring system.

It is an additional object of the present invention to provide a new and improved arrangement for positioning the control element of a measuring system to provide a linear operating characteristic.

It is still another object of the present invention to provide a system for automatically scanning a range of frequencies for the measurement of the characteristics of an unknown electrical signal source.

In accordance with one aspect of the present invention, the characteristics of an unknown electrical signal source may be measured by means of a frequency scanning device operated under the control of a servo system having two separate sections which enable the scanning device to have a linear operating characteristic with respect to a wide band of frequencies of the unknown signal source.

In a particular arrangement in accordance with the invention, an electrical signal from an unknown source is applied to a tunable filter the output of which is connected to a power measuring device, such as a bolometer. The output signal from the bolometer is applied to a graphical recorder which functions to plot the bolometer output signal as a function of the frequency of the tunable filter. By means of a servo system, the tunable filter is controlled in its operation in order to effect a linear operating characteristic in order that the output signal from the bolometer and the recorded characteristic of the electrical signal source may be truly representative of the power spectrum of the source.

In accordance with another aspect of the invention, a system is provided for adjusting a control element of a device having a given nonlinear characteristic response to the adjustment of the control element in order to effect a substantially constant rate of change in the characteristics of the device. One exemplary system described below for performing the above function includes a servo system having a movable element coupled to the control element of the device, with the servo system including a nonlinear electrical element which provides an output characteristic which varies in a nonlinear fashion to position the control element of the device in a manner in which a linear operating characteristic is achieved. Such a servo system may include two separate sections, within the first of which a linearly varying output signal is provided and within the second of which the aforementioned nonlinearly varying signal is provided. Where the system is employed in connection with the measurement of the power spectrum of an unknown signal source, as suggested above, the output signal from the first servo device may be applied to one axis of a graphical recorder, with the other axis of the graphical recorder being connected to respond to the output signal from the bolometer, whereby a graphical record of the characteristics of the unknown electrical signal source is provided without reference to the nonlinear characteristic of the tunable filter.

Figure 2:
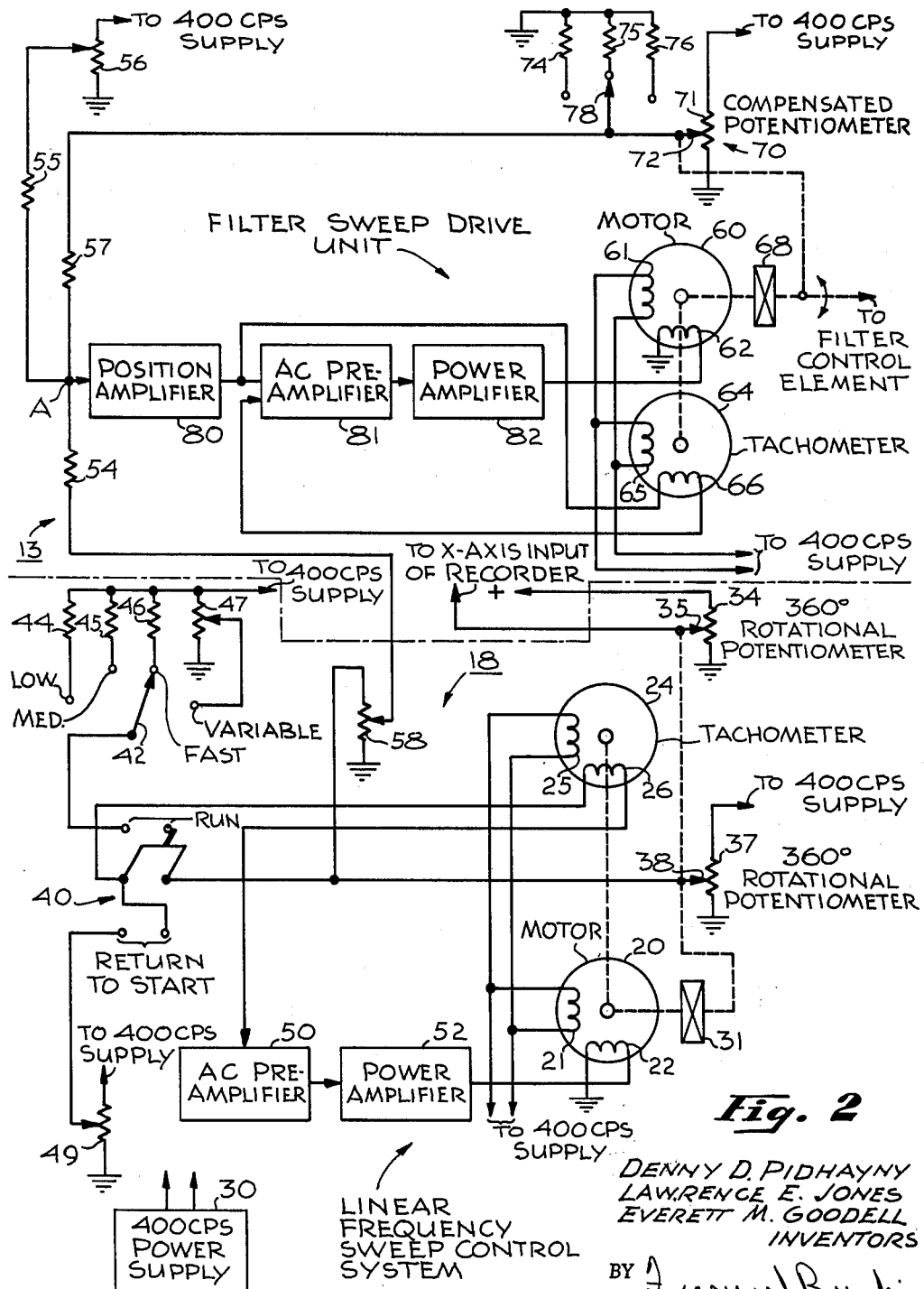

A better understanding of the invention may be had from a reading of the following detailed description and an inspection of the drawings, in which:

FIGURE 1 is a block diagram of a power spectrum analysis system in accordance with the invention; and FIG. 2 is a combined block and schematic circuit diagram of an arrangement for performing the functions of the filter sweep drive unit and linear sweep frequency control system of FIG. 1.

The general organization of a system in accordance with the invention for power spectrum analysis is illustrated in FIG. 1. A broad band signal source, such as a traveling wave tube 10, provides a random noise signal over a wide frequency band, such as from 2 to 4 kilomegacycles. The signals are provided to the input terminal of a tunable narrow band filter 11 which may be mechanically adjusted by a filter sweep drive unit 13. The frequency characteristic of the tunable narrow band filter 11 is such that the frequency to which the filter is tuned varies in a nonlinear fashion with respect to the position of its mechanical tuning mechanism. The bandpass of the filter 11 may be approximately 1 megacycle in the example given.

The alternating current signal passed by the filter 11 may be converted to a direct current signal by means of a power sensing device such as a bolometer 14. In order to compress the amplitude of the direct current signal, the output signal from the bolometer 14 is applied to a logarithmic converter 15, with the output signal from the logarithmic converter 15 being applied to a recorder 17.

In order to provide a proper plot of the characteristics of the broad band signal source 10, it is necessary that the recorder 17 be supplied with input signals which bear the correct relationship with respect to each other. For example, where the recorder 17 comprises a conventional recording device of the type which operates to plot the relationship between two variables in Cartesian or X-Y coordinates, the signal passed by the logarithmic converter 15 may be applied to the Y-axis of the recorder, and a suitable signal representing the frequency to which the filter 11 is tuned may be applied to the X-axis of the recorder. Inasmuch as the filter 11 has a nonlinear relationship between the frequency to which it is tuned and the mechanical position of its adjustment mechanism, it is necessary that some means be provided for maintaining the correct relationship between the signals applied to the recorder 17. For this purpose a linear sweep frequency control system 18 functions to provide an output signal which increases linearly with respect to time for application to the X-axis of the recorder 17. By means of the filter sweep drive unit 13 coupled between the linear sweep frequency control system 18 and the tunable filter 11, the adjustment of the tuning mechanism of the filter 11 may be made to take place on a nonlinear basis so as to achieve a linear relationship between the signal from the linear sweep frequency control system and the frequency to which the filter 11 is tuned. Accordingly, the signal applied to the X-axis of the recorder 17 represents the frequency to which the filter 11 is tuned, and the signal applied to the Y-axis of the recorder 17 corresponds to the power spectrum characteristic of the broad band signal source 10 as sampled by the tunable filter 11.

In FIG. 2 there is shown one suitable arrangement of a linear frequency sweep control system 18 and a filter sweep drive unit 13 which may be used in the system of FIG. 1 to generate a suitable signal for application to the recorder 17 and to control the adjustment of the tunable filter 11. The linear frequency sweep control system 18 of FIG. 2 comprises a tachometer feedback servo system which functions to control the rotation of a servo motor 20. The servo motor 20 includes a first winding 21 which may be connected to a suitable alternating current supply source 30 and a second winding 22 which receives an alternating current wave of reversible phase and variable amplitude so as to control the rotation of the motor 20. A tachometer 24 is rotationally linked to the motor 20 for the purpose of generating a rate feedback signal. One winding 25 of the tachometer 24 is connected to the alternating current supply source, while a second winding 26 is employed as a rate signal source across which appears an alternating current signal corresponding to the rate of rotation of the servo motor 20. One side of the tachometer winding 26 is connected to an A.-C. preamplifier 50, which in turn is connected to a power amplifier 52 which produces an alternating current wave for application to the winding 22 of the servo motor 20. The other side of the tachometer winding 26 is connected to one side of a double-pole double-throw switch 40 by means of which the mode of operation of the linear frequency sweep control system may be changed from a "run" mode to a "return-to-start" mode. In the "run" position, various resistors 44–47 may be selectively connected between the alternating current source and the winding 26 by means of the switch 42 so as to control the rate of rotation of the servo motor 20. The servo motor 20 drives two separate potentiometers 34 and 37 via a mechanical linkage which may include reduction gears 31. The resistance element of the potentiometer 34 may be connected to a direct current source, while the resistance element of the potentiometer 37 may be connected to the alternating current supply 30. Thus, a unidirectional signal may be derived from the contactor 35 having a magnitude corresponding to the rotational position of the servo motor 20, and, similarly, an alternating current signal may be derived from the contactor 38 having an amplitude corresponding to the rotational position of the servo motor 20.

The servo system thus described functions to maintain a balance between the rate signal derived from the tachometer winding 26 and the signal passed by the speed selector switch 42 so as to maintain a constant rotational velocity of the servo motor 20. As a result, the contactors of the potentiometers are swept along at a constant velocity so that a signal may be derived from the contactor 35 which is suitable for application to the X-axis input of the recorder 17 of FIG. 1. The alternating current signal derived from the contactor 38 is returned to the switch 40, which, when connected in its "return-to-start" mode, balances the voltage from the contactor 38 against an alternating current wave derived from a potentiometer 49, the resistance element of which may be connected between the alternating current source 30 and ground. By this means the potentiometer 49 functions as a zero sweep start adjustment which establishes the starting position of the motor 20 and hence the contactors 35 and 38 of the potentiometers 34 and 37.

In order to control the operation of the filter sweep drive unit 13 of FIG. 2, the alternating current wave from the contactor 38 may be applied to a position amplifier 80 via the resistor 54 and potentiometer 58. The filter sweep drive unit 13 comprises a servo system which is generally similar to that of the linear frequency sweep control system 18 except that the filter sweep drive unit 13 functions to position a mechanical element in a nonlinear fashion with respect to an input signal. By means of the fixed resistors 54, 55, and 57 and a potentiometer 56, the resistance element of which is connected between the alternating current supply and ground, a voltage is introduced into the input of the amplifier 80 which determines the starting position of the servo switch of the filter sweep drive unit 13. Furthermore, by means of a potentiometer 58, a fractional part of the alternating current wave from the contactor 38 may be selected for application to the position amplifier 80 so as to establish a relationship which enables the adjustment of the tunable filter 11 of FIG. 1 over a preset range. Thus, the function of the potentiometer 58 may be termed a sector width adjustment.

In operation, the filter sweep drive unit 13 compares the signals passed by the position amplifier 80 with rate signals derived from the winding 66 of a tachometer 64, the other winding 65 of which is connected to the alternating current supply 30. A servo motor 60 of the filter sweep drive unit 13 has one winding 61 connected to the alternating current supply 30 and receives an amplified wave of suitable amplitude and phase on a winding 62 to control the rotation of the servo motor 60. By this means a rate signal is derived from the tachometer winding 66 corresponding to the rotational speed of the motor 60 and an A.-C. preamplifier 81 and a power amplifier 82 function to generate a suitable alternating current wave for application to the motor winding 62 to maintain a balanced relationship between the rate signal and the signal passed by the position amplifier 80.

The motor 62 is linked to a compensated potentiometer 70 via the reduction gears 68. The compensated potentiometer 70 includes a resistance element having a nonlinear characteristic corresponding to the nonlinear characteristic of the device to be adjusted by the system. Thus, in the arrangement of FIG. 1, the tunable filter 11 has a certain nonlinear characteristic with respect to its frequency adjustment, and where the system of FIG. 2 is employed to control the adjustment of the tunable filter 11, the resistance element of the compensated potentiometer 70 may have a like nonlinear characteristic. Accordingly, there may be derived from the contactor 72 of the compensated potentiometer 70 an electrical signal having an amplitude corresponding to the position of the mechanism being adjusted, such as, for example, the tunable filter 11. A signal from the contactor 72 of the compensated potentiometer 70 is referenced to a given desired range of compensation through the selection of one of a group of resistors 74, 75, or 76 through the operation of the switch 78.

It may be seen that the signal fed back to circuit junction A from the filter sweep drive unit 13 may be considered to be subtracted from the signal applied from the linear frequency sweep control system 18 through the resistor 54. With a small amount of lag in the operation of the motor 60, the change in the compensated potentiometer 70 is such that a very slight error signal is derived as the difference signal at circuit junction A. This difference signal is applied through the position amplifier 80 to the output winding 66 of the tachometer 64. The amplitude of the output signal derived from the tachometer 64 is therefore dependent both upon the rate of movement of the shaft of the tachometer (i.e., the rate of movement of the shaft of the motor 60) and upon the difference signal appearing at circuit junction A. Through application of this output signal through an A.-C. preamplifier 81 and an A.-C. amplifier 82 to the control winding 62 of the motor, the servo system is controlled by the difference signal.

As the signal derived from the linear frequency sweep control system 18 changes linearly, therefore, the filter sweep drive unit 13 adjusts the filter control element nonlinearly so that the change of frequency of the filter will be linear. Stated in another way, a linear change in the output signal from the sweep control system 18 is made equal to a nonlinear change in the operation of the filter control element through use of the tachometric servo and the compensated potentiometer 70. The compensated potentiometer 70 defines the linear voltage-to-frequency relationship which is desired, while the tachometric servo ensures that this relationship is followed despite internal friction, backlash, and the like.

The above has been described in conjunction with the "run" mode, but the same principles of operation apply in the "return-to-start" mode, because the system merely seeks to adjust itself back to a selected reference position. The use of this system, which may be called a two-stage cascaded control servomechanism, permits a very rapid scan of the frequency spectrum of a broad band noise source. Despite the fact that the control element in the filter is driven at different rates of speed during a scan of the selected frequency spectrum, the actual rate of change of frequency is maintained substantially linear.

By connecting the contactor 35 of the potentiometer 34 to the X-axis input of the recorder and by linking the motor 60 to the adjustment mechanism of a nonlinear device such as the tunable filter of the system of FIG. 1, electrical signals may be derived bearing the proper relationship for application to an X–Y recorder to produce an accurate plot of the relationships involved, notwithstanding the nonlinear adjustment characteristic of the device to which the motor 60 is linked.

Although a specific arrangement has been illustrated and described for use in conjunction with the measurement of the power spectrum of a broad band signal source, it will be appreciated that the invention may be readily modified for use in other applications as well. Accordingly, the arrangement illustrated and described should be considered to be by way of example only of the manner in which the invention may be used to advantage. Therefore, any and all alternatives, modifications, or equivalent arrangements falling within the scope of the annexed claims should be considered to be a part of the invention.

What is claimed is:

1. In a system for measuring the power emanating from a broad band signal source, the combination of: a tunable narrow band filter for receiving signals from the broad band source; a bolometer coupled to receive signals passed by said tunable filter; tuning means linked to said tunable filter for causing said tunable filter to scan a frequency spectrum encompassing at least a portion of the signals provided by said broad band signal source; a servo control system coupled to said tuning means for providing an output signal corresponding to the position of said tunable filter; and graphical recording means coupled to said bolometer and to said servo system for plotting the signal provided by said bolometer as a function of the position of said tunable filter.

2. In a system for measuring power from a broad band electrical signal source as a function of frequency, the combination of: a tunable filter for receiving signals from said broad band source; means coupled to said filter for deriving a first signal representative of the electrical power content of electrical signals which are passed by said filter; electro-mechanical means linked to said filter for causing said tunable filter to scan a frequency spectrum encompassing at least a portion of the signals provided by said broad band signal source; means for providing a second signal which varies as a linear function of the frequency to which said filter is variably tuned; and graphical recorder means for plotting the relationship between said first and second signals to thereby indicate the relative power emanating from said electrical signal source at different frequencies within said band.

3. In a system for measuring the power supplied by a broad band signal source as a function of frequency, the combination of: a tunable filter for receiving signals from said broad band source, said tunable filter having a mechanically movable control element by means of which said filter may be caused to scan a frequency spectrum encompassing at least a portion of the signals provided by said broad band signal source; a first servo system for providing at least one output signal which varies in a predetermined fashion with respect to time; a second servo system coupled to said first servo system and linked to said control element for positioning the control element of said tunable filter as a nonlinear function of the signal from said first servo system so as to cause said tunable filter to scan a frequency spectrum as a linear function of the signal from said first servo system; and graphical recorder means coupled to said tunable filter and to said first servo system for plotting signals passed by said tunable filter as a function of frequency.

4. Apparatus in accordance with claim 3 including a bolometer coupled between said tunable filter and said graphical recorder whereby said graphical recorder is caused to plot the relationship between the power of the signals provided by said broad band signal source as a function of frequency.

5. Apparatus in accordance with claim 4 including a linear-to-logarithmic signal converter coupled between said bolometer and said graphical recorder means.

6. In a system for measuring the power of electrical signals emanating from a broad band signal source as a function of frequency, the combination of: a tunable filter for receiving signals from said broad band signal source, said tunable filter having a mechanically movable tuning means which functions to alter the transmission characteristics of said filter in a nonlinear fashion with respect to the position of said tuning means; a first servo system for providing at least one output signal which increases as a function of time; a second servo system coupled to said first servo system and linked to said tuning means for positioning said tuning means as a nonlinear function of the signal provided by said first servo system to cause the frequency transmission characteristics of said filter to vary in a linear fashion with respect to the signal provided by said first servo system; and graphical recorder means coupled to said first servo system and to said tunable filter for plotting the relationship between the signals passed by said tunable filter as a function of frequency.

7. Apparatus in accordance with claim 6 including a bolometer coupled between said tuning means and said graphical recorder means whereby the graphical recorder means functions to plot the power of the signals provided by said broad band signal source as a function of frequency.

8. Apparatus in accordance with claim 7 including a linear-to-logarithmic signal converter coupled between said bolometer and said graphical recorder means.

9. In a system for measuring the power of a broad band signal source as a function of frequency, the combination of: a tunable filter for receiving signals from the broad band signal source, said tunable filter having a mechanically movable tuning means which alters the frequency transmission characteristics of said filter as a nonlinear function of the position of said tuning means; a source of electrical signals which increase as a function of time; a servo system linked to said tuning means for positioning said tuning means as a nonlinear function of signals applied to said servo system whereby the frequency characteristics of said filter are varied as a linear function of signals applied to said servo system; a sector width control circuit coupled between said source of electrical signals and said servo system for controlling the width of the frequency spectrum scanned by said tunable filter; a position control circuit coupled to said servo system for defining the edge of the frequency spectrum scanned by said tunable filter in response to signals from said source of electrical signals; and graphical recorder means coupled to said source of electrical signals and to said tunable filter for plotting the relationship between signals passed by said tunable filter and the electrical signals.

10. Apparatus in accordance with claim 9 including a bolometer coupled between said tunable filter and said graphical recorder means whereby the graphical recorder means plots the power of the signals provided by said broad band signal source as a function of frequency.

11. Apparatus in accordance with claim 10 including a linear-to-logarithmic signal converter coupled between said bolometer and said graphical recorder means.

12. In combination with a device which characteristically exhibits a non-linear relation between positional adjustment of a control element which is adjustably connected to said device for controlling the same and variation of an amplitude-frequency response characteristic of said device which is controlled by said element;
    a control signal source;
    servo means linked to said control element for continuously repositioning the same in response to said signal and as a predetermined nonlinear function of said signal, with said nonlinear function being such that it complements said non-linear relation to provide a linear relationship between said control signal and said amplitude-frequency response characteristic;
    and means coupled to said control signal source and to said device for plotting a relationship between two variables substantially free from the effects of the non-linearity of said device.

13. In a system for scanning a frequency spectrum, the combination of:
    a device which exhibits a non-linear relationship between positional adjustment of a control element which is adjustably connected to said device for controlling the same and the frequency response characteristic of a circuit of said device which is controlled by said element;
    means for providing a control signal; and
    means linked to said control element and responsive to the control signal for continuously repositioning the same in response to said control signal and as a predetermined nonlinear function of said control signal, with said last mentioned means being characterized in that said non-linear function substantially compensates for said non-linear relationship to thereby provide for linear variation of said characteristic as a function of said control signal.

14. In a system for measuring power from a broad band electrical signal source as a function of frequency, the combination of:
    a tunable filter having a given non-linear relation between positional adjustment of a control element and the amplitude vs. frequency response characteristic of a filter circuit controlled by said element,
    a control signal source,
    a servo system coupled to said control signal source and linked to said tunable filter for variably positioning said element in response to said control signal and in accordance with a non-linear function of said control signal which substantially complements said non-linear relation to provide a linear relationship between the tuned frequency of said tunable filter and the signals from said control signal source,
    and graphical recorder means coupled to said control signal source and to said servo system for plotting the spectrum of said broad band electrical signal source as a function of frequency substantially free from the effects of the non-linearity of said tunable filter.

15. Apparatus in accordance with claim 14 including a bolometer coupled between said tunable filter and said graphical recorder means whereby the graphical recorder functions to plot power of the signals provided by said broad band signal source as a function of frequency.

16. Apparatus in accordance with claim 15 including a linear-to-logarithmic signal converter coupled between said bolometer and said graphical recorder means.

References Cited in the file of this patent

UNITED STATES PATENTS

| | | |
|---|---|---|
| 2,239,781 | Golicke et al. | Apr. 29, 1941 |
| 2,280,678 | Waymouth | Apr. 21, 1942 |
| 2,380,791 | Rosencrans | July 31, 1945 |
| 2,518,926 | O'Neal | Aug. 16, 1950 |
| 2,584,004 | Enslein | Jan. 29, 1952 |
| 2,879,486 | Grandmont et al. | Mar. 24, 1959 |

FOREIGN PATENTS

| | | |
|---|---|---|
| 1,108,534 | France | Aug. 31, 1955 |